US012784061B2

(12) United States Patent
Watanabe et al.

(10) Patent No.: US 12,784,061 B2
(45) Date of Patent: Nov. 3, 2026

(54) EMISSION AMOUNT MANAGEMENT DEVICE, CHARGING DEVICE, AND EMISSION AMOUNT MANAGEMENT METHOD

(71) Applicant: Panasonic Intellectual Property Management Co., Ltd., Osaka (JP)

(72) Inventors: Kenichi Watanabe, Osaka (JP); Yuji Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/992,855

(22) PCT Filed: May 26, 2023

(86) PCT No.: PCT/JP2023/019630

§ 371 (c)(1),
(2) Date: Jan. 9, 2025

(87) PCT Pub. No.: WO2024/024251

PCT Pub. Date: Feb. 1, 2024

(65) Prior Publication Data

US 2026/0010913 A1 Jan. 8, 2026

(30) Foreign Application Priority Data

Jul. 25, 2022 (JP) ................................. 2022-118223

(51) Int. Cl.
*G08G 1/16* (2006.01)
*B60L 53/67* (2019.01)
(Continued)

(52) U.S. Cl.
CPC ............ *G06Q 30/018* (2013.01); *B60L 53/67* (2019.02); *B60L 58/12* (2019.02)

(58) Field of Classification Search
CPC .. G06Q 30/018; G06Q 30/0283; G06Q 30/04; G06Q 50/06; G06Q 50/26;
(Continued)

(56) References Cited

U.S. PATENT DOCUMENTS

2012/0075090 A1 3/2012 Satake et al.
2015/0253364 A1* 9/2015 Hieda ................ H02J 13/1333 702/62
(Continued)

FOREIGN PATENT DOCUMENTS

JP 2010-198279 A 9/2010
JP 2010-239704 A 10/2010
(Continued)

OTHER PUBLICATIONS

JP-2014011849-A machine translation (Year: 2014).*
(Continued)

*Primary Examiner* — Anne Marie Antonucci
*Assistant Examiner* — Jingli Wang
(74) *Attorney, Agent, or Firm* — Rimon P.C.

(57) ABSTRACT

An emission amount management device includes: a first obtainer that obtains charge information including information indicating a carbon dioxide emission amount per unit electric power amount of electric power with which an electric vehicle is charged and a charge electric power amount; a second obtainer that obtains first discharge information including a first discharge electric power amount consumed by the electric vehicle during traveling; and a manager that selects, from charge history information including a history of the carbon dioxide emission amount per unit electric power amount and the charge electric power amount, the carbon dioxide emission amount per unit electric power amount and the charge electric power amount to be assigned to the first discharge electric power amount, and
(Continued)

calculates a carbon dioxide emission amount from the carbon dioxide emission amount per unit electric power amount selected and the first discharge electric power amount.

12 Claims, 14 Drawing Sheets

(51) Int. Cl.
*B60L 58/12* (2019.01)
*G06Q 30/018* (2023.01)
*G08G 5/80* (2025.01)
*G08G 7/02* (2006.01)

(58) Field of Classification Search
CPC ........ G06Q 50/40; G06Q 10/30; B60L 53/67; B60L 58/12; B60L 2240/70; B60L 2240/72; B60L 2270/10; B60L 3/12; B60L 53/665; Y02T 10/70
See application file for complete search history.

(56) References Cited

U.S. PATENT DOCUMENTS

2021/0295348 A1 9/2021 Kobayashi et al.
2024/0391346 A1* 11/2024 McCloskey ........... H04L 63/083

FOREIGN PATENT DOCUMENTS

JP 2014011849 A * 1/2014
JP 2020-091771 A 6/2020
WO WO-2007066198 A2 * 6/2007 ................ H02J 7/90

OTHER PUBLICATIONS

Extended European Search Report dated Sep. 25, 2025 issued in the corresponding European Patent Application No. 23845989.5.

International Search Report dated Aug. 15, 2023 issued in International Patent Application No. PCT/JP2023/019630, with English translation.

Ministry of the Environment, Government of Japan, "Monogatari de wakaru Supply Chain Haishutsuryo Santei (Understanding Supply Chain Emissions Calculation Through Stories)", Mar. 2016, (Internet: https://www.env.go.jp/earth/ondanka/supply_chain/gvc/files/tools/Supply-chain_A3.pdf) with its partial English translation.

Ministry of Economy, Trade and Industry, and Ministry of the Environment, Government of Japan, "Guidance for Encouraging Japanese Companies to Address International Initiatives on Climate Change:-Supporting Companies Making Use of Renewable Energy in Japan under Scope 2 Guidance of the GHG Protocol-", formulated in Mar. 2019, revised in Mar. 2021 with its partial English translation.

* cited by examiner

FIG. 3A

| Vehicle ID | Carbon dioxide emission amount per unit electric power amount | Charge electric power amount |
|---|---|---|

FIG. 3B

| Vehicle ID | Travel distance | Discharge electric power amount during traveling |
|---|---|---|

FIG. 4

| Vehicle ID | Cumulative emission amount |
|---|---|
| AAAAA | 0.15t-$CO_2$ |

FIG. 5

| Vehicle ID | Date and time | Carbon dioxide emission amount per unit electric power amount | Charge electric power amount |
|---|---|---|---|
| AAAAA | YYYY/MM/DD 12:00 | 0.000500t-$CO_2$/kWh | 6 kWh |
| AAAAA | YYYY/MM/DD 23:00 | 0.000000t-$CO_2$/kWh | 3 kWh |
| ... | ... | ... | ... |

FIG. 6

| Vehicle ID | Date and time | Travel distance | Discharge electric power amount during traveling |
|---|---|---|---|
| AAAAA | YYYY/MM/DD 9:00 | 21 km | 3 kWh |
| AAAAA | YYYY/MM/DD 9:00 | 7 km | 1 kWh |
| ... | ... | ... | ... |

FIG. 9

| Vehicle ID | Carbon dioxide emission amount per unit electric power amount | Charge electric power amount |
|---|---|---|
| AAAAA | 0.000300t-$CO_2$/kWh | 4 kWh |

FIG. 10

| Vehicle ID | Carbon dioxide emission amount per unit electric power amount | Charge electric power amount | |
|---|---|---|---|
| AAAAA | 0.000500t-$CO_2$/kWh | 6 kWh | |
| AAAAA | 0.000000t-$CO_2$/kWh | 3 kWh | |
| AAAAA | 0.000300t-$CO_2$/kWh | 4 kWh | ← Added |

FIG. 11

| Vehicle ID | Travel distance | Discharge electric power amount during traveling |
|---|---|---|
| AAAAA | 28 Km | 4 kWh |

FIG. 12

| Vehicle ID | Carbon dioxide emission amount per unit electric power amount | Charge electric power amount | |
|---|---|---|---|
| AAAAA | 0.000500t-$CO_2$/kWh | 5 kWh | ← 6 kWh → 5 kWh |
| ~~AAAAA~~ | ~~0.000000t-$CO_2$/kWh~~ | ~~3 kWh~~ | ← Deleted |

FIG. 13

| Vehicle ID | Cumulative emission amount |
|---|---|
| AAAAA | 0.1505t-$CO_2$ |

FIG. 15

| Vehicle ID | Discharge electric power amount during non-traveling |
|---|---|

FIG. 16

| Vehicle ID | Date and time | Discharge electric power amount |
|---|---|---|
| AAAAA | YYYY/MM/DD 21:00 | 1.5 kWh |
| AAAAA | YYYY/MM/DD 21:00 | 1k Wh |
| ... | ... | ... |

FIG. 18

| Vehicle ID | Discharge electric power amount during non-traveling |
|---|---|
| AAAAA | 5 kWh |

FIG. 19

| Vehicle ID | Carbon dioxide emission amount per unit electric power amount | Charge electric power amount | |
|---|---|---|---|
| ~~AAAAA~~ | ~~0.000500t-$CO_2$/kWh~~ | ~~5 kWh~~ | ← Deleted |
| AAAAA | 0.000000t-$CO_2$/kWh | 3 kWh | |

FIG. 20A

| Vehicle ID | Carbon dioxide emission amount per unit electric power amount | Charge electric power amount |
|---|---|---|
| AAAAA | 0.000500t-$CO_2$/kWh | 1 kWh |

FIG. 20B

| Vehicle ID | Carbon dioxide emission amount per unit electric power amount | Charge electric power amount |
|---|---|---|
| BBBBB | 0.000300t-$CO_2$/kWh | 5 kWh |
| BBBBB | 0.000000t-$CO_2$/kWh | 2 kWh |

FIG. 21A

| Vehicle ID | Carbon dioxide emission amount per unit electric power amount | Charge electric power amount |
|---|---|---|
| AAAAA | 0.000300t-$CO_2$/kWh | 5 kWh |

FIG. 21B

| Vehicle ID | Discharge electric power amount during non-traveling |
|---|---|
| BBBBB | 5 kWh |

FIG. 22A

| Vehicle ID | Carbon dioxide emission amount per unit electric power amount | Charge electric power amount | |
|---|---|---|---|
| AAAAA | 0.000500t-$CO_2$/kWh | 1 kWh | |
| AAAAA | 0.000300t-$CO_2$/kWh | 5 kWh | ← Added |

FIG. 22B

| Vehicle ID | Carbon dioxide emission amount per unit electric power amount | Charge electric power amount | |
|---|---|---|---|
| ~~BBBBB~~ | ~~0.000300t-$CO_2$/kWh~~ | ~~5 kWh~~ | ← Deleted |
| BBBBB | 0.000000t-$CO_2$/kWh | 2 kWh | |

EMISSION AMOUNT MANAGEMENT DEVICE, CHARGING DEVICE, AND EMISSION AMOUNT MANAGEMENT METHOD

CROSS-REFERENCE TO RELATED APPLICATIONS

This application is the U.S. National Phase under 35 U.S.C. § 371 of International Patent Application No. PCT/JP2023/019630, filed on May 26, 2023, which in turn claims the benefit of Japanese Patent Application No. 2022-118223, filed on Jul. 25, 2022, the entire disclosures of which Applications are incorporated by reference herein.

TECHNICAL FIELD

The present invention relates to an emission amount management device, a charging device, and an emission amount management method.

BACKGROUND ART

In recent years, electric cars (an example of electric vehicles) that use electric energy have been rapidly put to practical use as environmentally friendly vehicles. Electric cars run on a motor that is driven by electric energy stored in a battery which is charged with electric energy. Thus, electric cars themselves do not emit carbon dioxide ($CO_2$) during traveling.

However, even with electric cars, carbon dioxide may be emitted indirectly when, for example, generating electric energy consumed by the motor. For example, in thermal power generation, $CO_2$ is emitted when generating electric energy.

Hence, for electric cars, there is a requirement to calculate the $CO_2$ emission amount according to the amount of electric power used for traveling, for consideration for the global environment. In addition, the Scope 3 standard of the GHG (Greenhouse Gas) Protocol requires companies to manage indirect GHG emissions in their supply chains (Category 11). For example, car manufacturers (automakers) are required to manage $CO_2$ emissions when using electric cars that they sell.

For example, Patent Literature (PTL) 1 discloses a device that calculates the $CO_2$ emission amounts of electric cars.

CITATION LIST

Patent Literature

[PTL 1]
Japanese Unexamined Patent Application Publication No. 2010-198279

SUMMARY OF INVENTION

Technical Problem

It is desirable to calculate $CO_2$ emission amounts more accurately.

The present invention accordingly provides an emission amount management device, charging device, and emission amount management method that can more accurately calculate a $CO_2$ emission amount related to traveling of an electric vehicle.

Solution to Problem

An emission amount management device according to an aspect of the present invention is an emission amount management device that manages a carbon dioxide emission amount related to traveling of an electric vehicle, the emission amount management device including: a first obtainer that obtains charge information including information indicating a carbon dioxide emission amount per unit electric power amount of electric power with which the electric vehicle is charged and a charge electric power amount; a second obtainer that obtains first discharge information including a first discharge electric power amount consumed by the electric vehicle during the traveling; and a manager that selects, from history information including a history of the carbon dioxide emission amount per unit electric power amount and the charge electric power amount, the carbon dioxide emission amount per unit electric power amount and the charge electric power amount to be assigned to the first discharge electric power amount, and calculates the carbon dioxide emission amount from the carbon dioxide emission amount per unit electric power amount selected and the first discharge electric power amount.

A charging device according to an aspect of the present invention is a charging device that, when charging an electric vehicle, transmits information indicating a carbon dioxide emission amount per unit electric power amount of electric power with which the electric vehicle is charged and a charge electric power amount to the above-described emission amount management device.

An emission amount management method according to an aspect of the present invention is an emission amount management method of managing a carbon dioxide emission amount related to traveling of an electric vehicle, the emission amount management method including: obtaining charge information including information indicating a carbon dioxide emission amount per unit electric power amount of electric power with which the electric vehicle is charged and a charge electric power amount; obtaining discharge information including a discharge electric power amount consumed by the electric vehicle during the traveling; and selecting, from history information including a history of the carbon dioxide emission amount per unit electric power amount and the charge electric power amount, the carbon dioxide emission amount per unit electric power amount and the charge electric power amount to be assigned to the discharge electric power amount, and calculating the carbon dioxide emission amount from the carbon dioxide emission amount per unit electric power amount selected and the discharge electric power amount.

Advantageous Effects of Invention

According to an aspect of the present invention, it is possible to provide an emission amount management device, etc. that can more accurately calculate a $CO_2$ emission amount related to traveling of an electric vehicle.

BRIEF DESCRIPTION OF DRAWINGS

FIG. 3A is a diagram illustrating the format of information obtained by a first obtainer according to Embodiment 1.

FIG. 3B is a diagram illustrating the format of information obtained by a second obtainer according to Embodiment 1.

FIG. 4 is a diagram illustrating a cumulative $CO_2$ emission amount stored in a storage according to Embodiment 1.

FIG. 5 is a diagram illustrating charge history information stored in the storage according to Embodiment 1.

FIG. 6 is a diagram illustrating first discharge history information stored in the storage according to Embodiment 1.

FIG. 9 is a diagram illustrating charge information obtained in Step S101 in FIG. 8.

FIG. 10 is a diagram for explaining a list update process executed in Step S102 in FIG. 8.

FIG. 11 is a diagram illustrating first discharge information obtained in Step S103 in FIG. 8.

FIG. 12 is a diagram for explaining a list update process executed in Step S104 in FIG. 8.

FIG. 13 is a diagram for explaining cumulative emission amount updating executed in Step S105 in FIG. 8.

FIG. 15 is a diagram illustrating the format of information obtained by a third obtainer according to Embodiment 2.

FIG. 16 is a diagram illustrating second discharge history information stored in a storage according to Embodiment 2.

FIG. 18 is a diagram illustrating second discharge information obtained in Step S24 in FIG. 17.

FIG. 19 is a diagram for explaining a list update process executed in Step S26 in FIG. 17.

FIG. 20A is a diagram illustrating charge history information in a first vehicle for explaining electric power interchange between vehicles.

FIG. 20B is a diagram illustrating charge history information in a second vehicle for explaining electric power interchange between vehicles.

FIG. 21A is a diagram illustrating electric power amount data of electric power that the first vehicle has been provided from the second vehicle.

FIG. 21B is a diagram illustrating electric power amount data of electric power that the second vehicle has provided to the first vehicle.

FIG. 22A is a diagram for explaining a list update process for the first vehicle.

FIG. 22B is a diagram for explaining a list update process for the second vehicle.

DESCRIPTION OF EMBODIMENTS

Certain exemplary embodiments will be described in detail below with reference to the drawings.

Each of the embodiments described below shows a general or specific example. The numerical values, shapes, structural elements, the arrangement and connection of the structural elements, steps, the processing order of the steps etc. illustrated in the following embodiments are mere examples, and do not limit the scope of the present invention. Of the structural elements in the embodiments described below, the structural elements not recited in any one of the independent claims will be described as optional structural elements.

Each drawing is a schematic and does not necessarily provide precise depiction. For example, scale and the like are not necessarily consistent throughout the drawings. The substantially same elements are given the same reference marks throughout the drawings, and repeated description is omitted or simplified.

In the specification, the terms indicating the relationships between elements, such as "same" and "equal", the numerical values, and the numerical ranges are not expressions of strict meanings only, but are expressions of meanings including substantially equivalent ranges, for example, allowing for a difference of about several percent (e.g. about 10%).

In this specification, ordinal numbers such as "first" and "second" do not mean the numbers or order of structural elements unless otherwise specified, but are used for the purpose of avoiding confusion and distinguishing between structural elements of the same type.

Embodiment 1

An emission amount management system including an emission amount management device according to this embodiment will be described below with reference to FIGS. 1 to 13.

[1-1. Structure of Emission Amount Management System]

Figure 1:
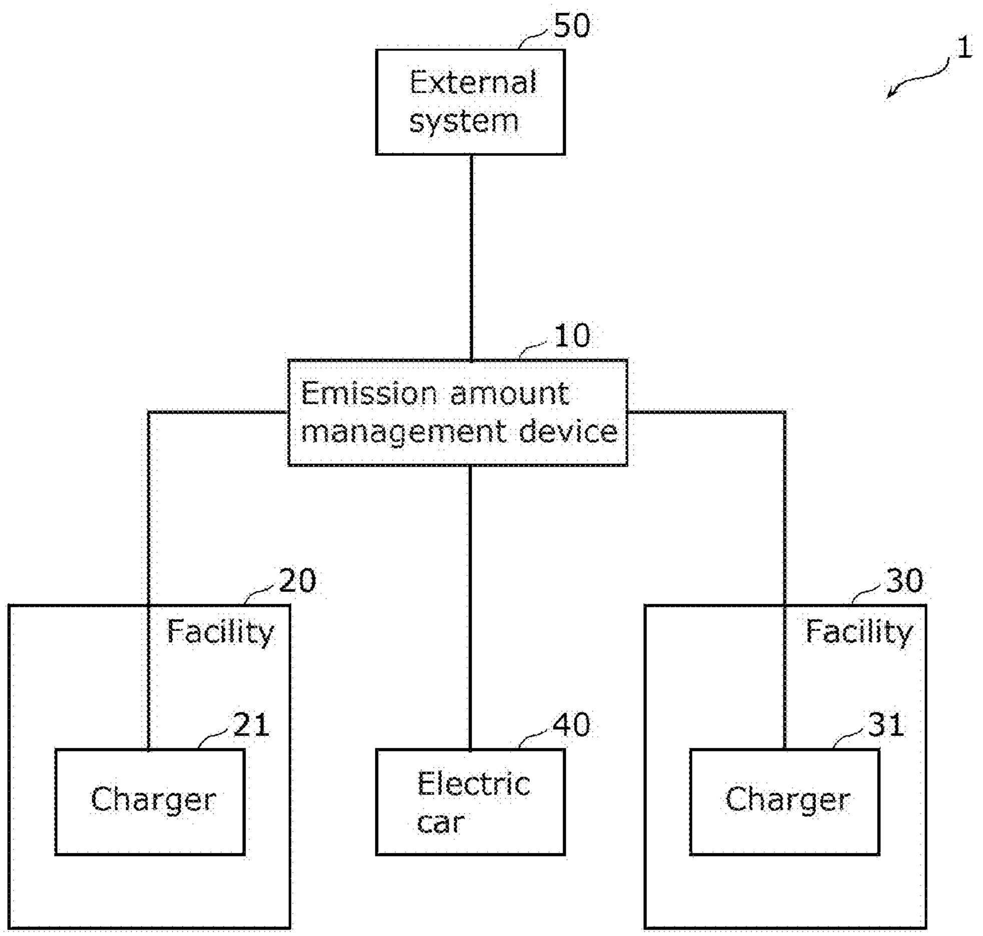
FIG. 1 is a block diagram illustrating the structure of an emission amount management system according to Embodiment 1.

First, the structure of the emission amount management system according to this embodiment will be described with reference to FIGS. 1 to 6. FIG. 1 is a block diagram illustrating the structure of emission amount management system 1 according to this embodiment. Although the following will describe an example in which emission amount management system 1 includes chargers 21 and 31, emission amount management system 1 may include a charger-discharger.

As illustrated in FIG. 1, emission amount management system 1 includes emission amount management device 10 and chargers 21 and 31. Emission amount management system 1 may further include electric car 40 and external system 50. Emission amount management system 1 is a system that calculates the amount of carbon dioxide ($CO_2$) emitted by traveling of electric car 40 sold by a car manufacturer. Specifically, emission amount management system 1 is a system that calculates the amount of $CO_2$ emissions resulting from generating electric power with which electric car 40 is charged.

Emission amount management device 10 is an information processing device that manages a $CO_2$ emission amount related to traveling of an electric vehicle (e.g. electric car 40) that includes a motor as a drive source. The "$CO_2$ emission amount related to traveling" includes the amount of $CO_2$ indirectly emitted by electric car 40 traveling. Emission amount management device 10 is communicably connected to chargers 21 and 31, electric car 40, and external system 50. Emission amount management device 10 calculates a $CO_2$ emission amount related to traveling of electric car 40 based on information from chargers 21 and 31 and information from electric car 40, and outputs the calculated $CO_2$ emission amount to external system 50.

Figure 2:
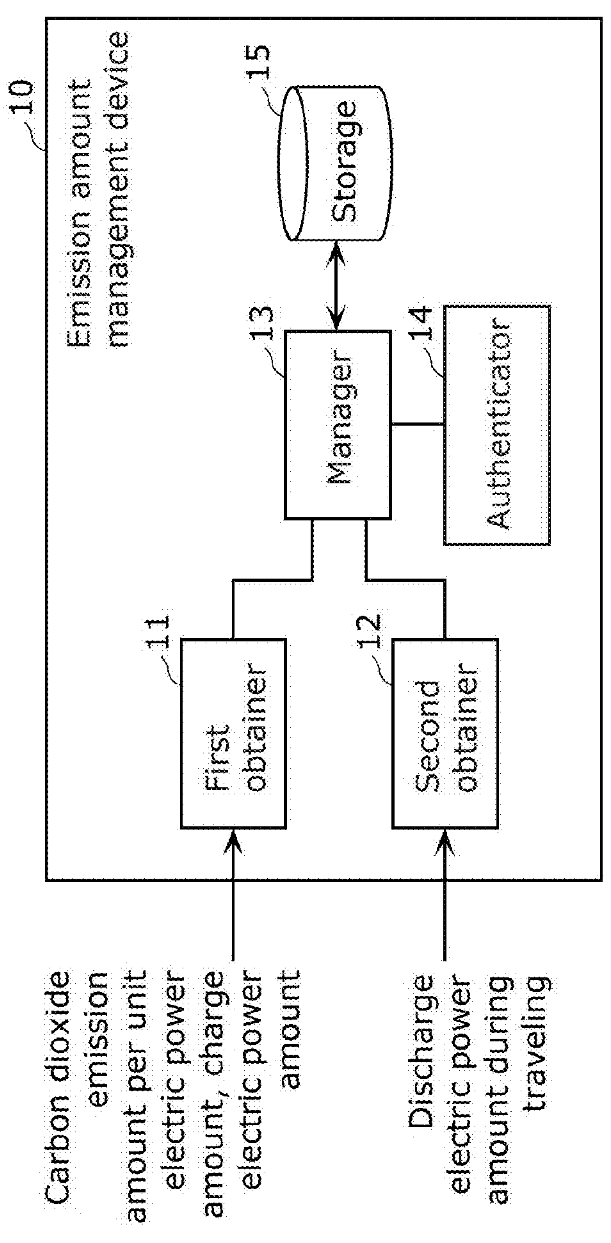
FIG. 2 is a block diagram illustrating the functional structure of an emission amount management device according to Embodiment 1.

FIG. 2 is a block diagram illustrating the functional structure of emission amount management device 10 according to this embodiment.

As illustrated in FIG. 2, emission amount management device 10 includes first obtainer 11, second obtainer 12, manager 13, authenticator 14, and storage 15.

First obtainer 11 obtains information related to charging of electric car 40 when electric car 40 is charged using charger 21 or 31, from charger 21 or 31. First obtainer 11 includes a communication circuit (communication module).

FIG. 3A is a diagram illustrating the format of information (information related to charging of electric car 40) obtained by first obtainer 11 according to this embodiment.

As illustrated in FIG. 3A, first obtainer 11 obtains charge information in which the vehicle ID of electric car 40, a $CO_2$ emission amount per unit electric power amount, and a charge electric power amount are associated with each other from a charger used to charge electric car 40. The charge information includes first information indicating the $CO_2$ emission amount per unit electric power amount when generating electric power with which electric car 40 is charged, and second information indicating the charge electric power amount. The information indicating the $CO_2$ emission amount per unit electric power amount may be the $CO_2$ emission amount per unit electric power amount itself, or information that enables the $CO_2$ emission amount per unit electric power amount to be identified, such as the retail electricity supplier and electricity rate menu with which facility 20 or 30 where charger 21 or 31 is located contracts. Facility 20 is, for example, a residence, a hospital, a school, an office building, or any other building.

Referring again to FIG. 2, second obtainer 12 obtains information related to traveling of electric car 40 when electric car 40 travels, from electric car 40 or external system 50. In other words, second obtainer 12 obtains information when electric car 40 discharges during traveling. Second obtainer 12 includes a communication circuit (communication module). The communication circuit (communication module) may be one communication circuit common to first obtainer 11 and second obtainer 12.

FIG. 3B is a diagram illustrating the format of information (information related to traveling of electric car 40) obtained by second obtainer 12 according to this embodiment.

As illustrated in FIG. 3B, second obtainer 12 obtains discharge information (first discharge information) in which the vehicle ID of electric car 40, a travel distance, and a discharge electric power amount during traveling are associated with each other from electric car 40 or external system 50. The discharge electric power amount during traveling indicates the amount of electric power consumed by electric car 40 during travelling. Second obtainer 12 obtains at least the discharge electric power amount. In other words, the travel distance may be calculated from the discharge electric power amount during traveling and a predetermined electricity consumption. The discharge electric power amount during traveling is an example of a first discharge electric power amount. Second obtainer 12 may obtain the difference value between the remaining capacity before travelling and the remaining capacity after travelling instead of the discharge electric power amount during traveling, and calculate the discharge electric power amount during traveling from the obtained difference value (kWh) or calculate the discharge electric power amount during traveling from the obtained difference value (%) and the rated capacity. Thus, second obtainer 12 only needs to obtain information that enables the discharge electric power amount during traveling to be calculated.

Referring again to FIG. 2, manager 13 is a processing unit that calculates the $CO_2$ emission amount of electric car 40 based on the information obtained from first obtainer 11 and second obtainer 12. Manager 13 selects, from charge history information (see FIG. 5 described later) stored in storage 15, a $CO_2$ emission amount per unit electric power amount and charge electric power amount to be assigned to the discharge electric power amount during traveling, and calculates the $CO_2$ emission amount during traveling from the selected $CO_2$ emission amount per unit electric power amount and the discharge electric power amount during traveling. Manager 13 then adds the calculated $CO_2$ emission amount to a cumulative emission amount. That is, manager 13 calculates an integrated value of $CO_2$ emission amounts for a predetermined period. The predetermined period may be a period based on a law such as the Energy Conservation Act, or a period set by the car manufacturer or the like.

Manager 13 may further execute a process of updating data used to calculate the $CO_2$ emission amount based on the information obtained from first obtainer 11 and second obtainer 12. For example, manager 13 may execute a process of updating the $CO_2$ emission amount per unit electric power amount and charge electric power amount in the charge history information based on the information obtained from first obtainer 11 and second obtainer 12.

Authenticator 14 executes a process related to authentication between chargers 21 and 31 and electric car 40. For example, when charger 21 or 31 and electric car 40 are connected via a charge plug, authenticator 14 obtains information required for authentication from an information terminal such as a smartphone on which a dedicated application is installed. The information required for authentication includes, for example, the ID of electric car 40, the ID of the user, and the ID of charger 21 or 31, but is not limited to such. When the authentication is completed, authenticator 14 transmits a permission signal to charge to the charger connected to electric car 40.

If electric car 40 is connected to a charger-discharger, authenticator 14 transmits a permission signal to charge, discharge, or charge and discharge to the charger-discharger when the authentication is completed.

Storage 15 is a storage device that stores various data for managing $CO_2$ emission amounts. Storage 15 is, for example, semiconductor memory, but is not limited to such.

First obtainer 11 and second obtainer 12 may, instead of obtaining the vehicle ID, identify the vehicle ID from the ID of the user obtained by authenticator 14 and association information between the ID of the user and the vehicle ID stored in storage 15 in advance. Moreover, if manager 13 cannot obtain the vehicle ID, manager 13 may manage each item of history information (e.g. first discharge history information described later) by the ID of the user instead of the vehicle ID.

Various data stored in storage 15 will be described with reference to FIGS. 4 to 6. FIG. 4 is a diagram illustrating a cumulative $CO_2$ emission amount stored in storage 15 according to this embodiment.

FIG. 5 is a diagram illustrating charge history information stored in storage 15 according to this embodiment. FIG. 6 is a diagram illustrating first discharge history information (data of discharge electric power amount during traveling) stored in storage 15 according to this embodiment.

As illustrated in FIG. 4, storage 15 may store information indicating a cumulative emission amount for each vehicle ID. FIG. 4 illustrates an example in which the cumulative $CO_2$ emission amount of electric car 40 whose vehicle ID is “AAAAA” is 0.15 t (0.15 tons).

As illustrated in FIG. 5, storage 15 stores charge history information in which a vehicle ID, a date and time, a $CO_2$ emission amount per unit electric power amount, and a charge electric power amount are associated with each other. The date and time are, for example, the date and time when electric car 40 was charged, and may be obtained from charger 21 or 31. The date and time may include the charge start time and the charge end time. The $CO_2$ emission amount per unit electric power amount indicates the amount of $CO_2$ emissions per unit electric power amount that are estimated to have occurred when the electric power with which electric car 40 was charged was generated. For example, for electric power generated by a power generation method that emits $CO_2$ during power generation, such as thermal power generation, the $CO_2$ emission amount per unit electric power amount is a value greater than 0 according to the power generation method. For electric power generated using renewable energy, the $CO_2$ emission amount per unit electric power amount is 0. The $CO_2$ emission amount per unit electric power amount may be set in advance depending on the power generation method, etc. Even in the case of electric power generated by a power generation method that emits $CO_2$ during power generation, such as thermal power generation, if a non-fossil fuel certificate has been granted, the $CO_2$ emission amount per unit electric power amount may be set to 0. The charge electric power amount indicates the amount of electric power with which electric car 40 was charged.

Data of past two charge operations is illustrated in the example in FIG. 5. In other words, the charge history information may include a plurality of pairs of $CO_2$ emission amounts per unit electric power amount and charge electric power amounts. The charge history information is an example of history information.

As illustrated in FIG. 6, storage 15 stores first discharge history information in which a vehicle ID, a date and time, a travel distance, and a discharge electric power amount during traveling are associated with each other. The date and time are, for example, the date and time when electric car 40 traveled (i.e. discharged). The date and time may include the discharge start time and the discharge end time. The travel distance is the distance that electric car 40 traveled in one run. The discharge electric power amount during traveling indicates the amount of electric power discharged during traveling. Data of past two travel operations is illustrated in the example in FIG. 6.

Storage 15 may also store, for example, an integrated value of travel distances (cumulative travel distance). The cumulative travel distance may be updated by manager 13 if the information related to traveling of electric car 40 includes the travel distance.

Storage 15 is not limited to being included in emission amount management device 10. For example, storage 15 may be included in an external device (such as a cloud server) capable of communicating with emission amount management device 10.

Referring again to FIG. 1, chargers 21 and 31 are each an example of a charging device, and charge electric car 40 with electric power. Chargers 21 and 31 each include a charge plug connected to electric car 40, a sensor that measures the charge electric power amount, a controller that performs charge-related control, and a transmitter that transmits, when electric car 40 is charged, the $CO_2$ emission amount per unit electric power amount of the electric power with which electric car 40 is charged and the charge electric power amount to emission amount management device 10. The transmitter includes, for example, a communication circuit (communication module). Chargers 21 and 31 may be configured so that the power generation source of the electric power supplied (e.g. the power generation method or the supplier of the electric power), that is, the amount of $CO_2$ emitted when generating the electric power, can be identified. Chargers 21 and 31 may be switchable between supplying renewable energy such as solar power generation or wind power generation and supplying electric power generated by emitting $CO_2$ such as thermal power generation.

Emission amount management system 1 may include a charger-discharger capable of charging and discharging in place of at least one of charger 21 or 31 or in addition to chargers 21 and 31. In this case, the sensor measures at least one of a charge electric power amount or a discharge electric power amount. The charging device is a device that has at least a charging function, and a charger-discharger is also an example of the charging device.

Electric car 40 is an electric vehicle whose $CO_2$ emission amount is to be estimated. The electric vehicle is not limited to electric car 40, and may be any vehicle that includes a motor as a drive source or a power generator. For example, the electric vehicle may be a vehicle that includes a motor and an engine as a drive source (i.e. hybrid car or plug-in hybrid car), a vehicle that generates electric power with an engine and runs on a motor, an electric motorcycle, or an electric bicycle.

Electric car 40 may be capable of communicating with external system 50 without going through emission amount management device 10. Electric car 40 includes a sensor capable of measuring at least one of a charge electric power amount or a discharge electric power amount. In this embodiment, the sensor has a function of calculating or measuring at least a discharge electric power amount.

External system 50 is a server device managed by the car manufacturer or the like. In this embodiment, external system 50 obtains $CO_2$ emission amounts from emission amount management device 10 and manages (e.g. accumulates) them.

[1-2. Operation of Emission Amount Management System]

Figure 7:
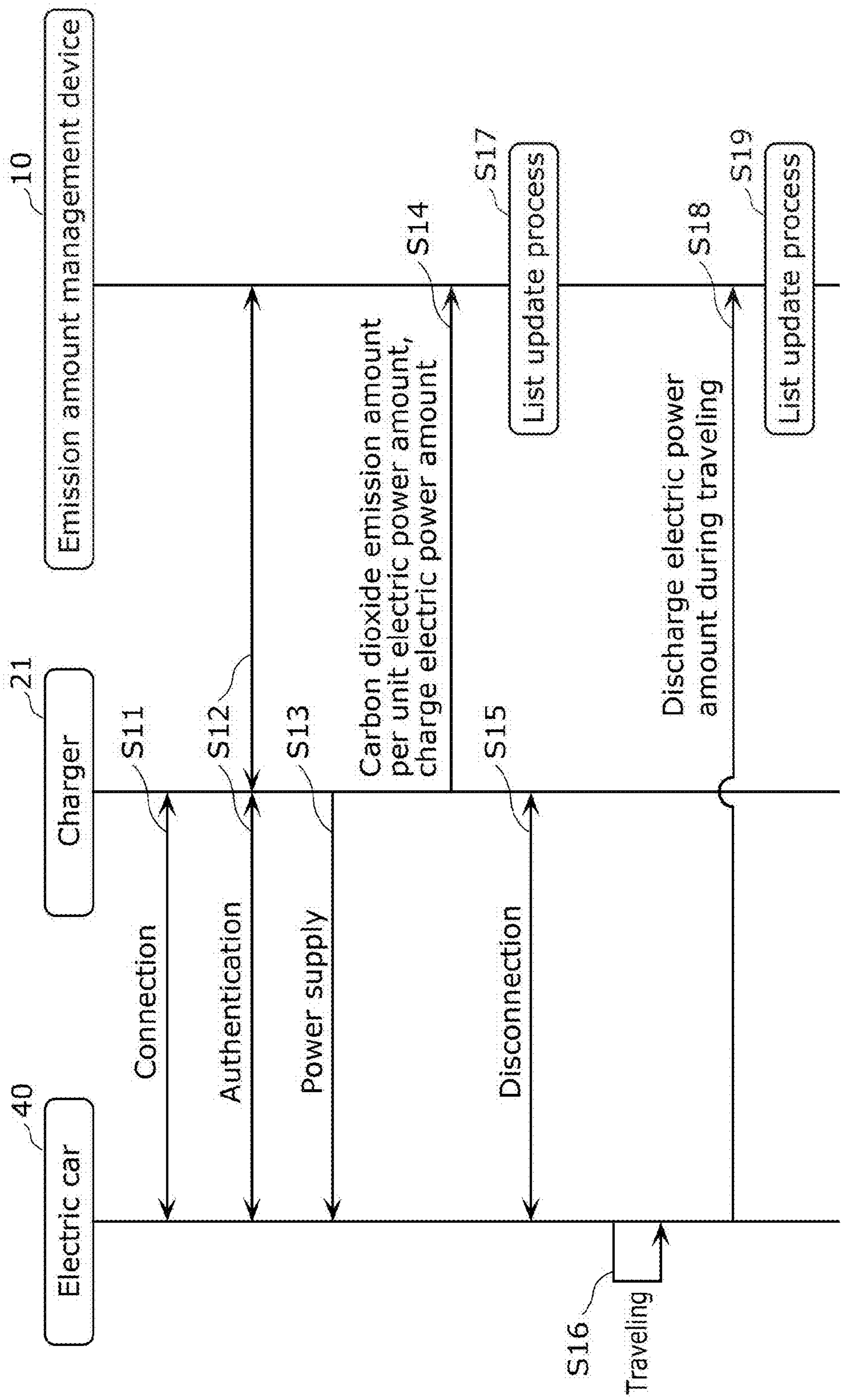
FIG. 7 is a sequence diagram illustrating the operation of the emission amount management system according to Embodiment 1.

Next, the operation of emission amount management system 1 having the above-described structure will be described with reference to FIGS. 7 to 13. FIG. 7 is a sequence diagram illustrating the operation (emission amount management method) of emission amount management system 1 according to this embodiment. FIG. 7 illustrates an example in which electric car 40 is connected to charger 21.

As illustrated in FIG. 7, first, electric car 40 is connected to charger 21 (S11). Step S11 is executed by the user, for example, but may be executed automatically.

Authenticator 14 executes an authentication process between the user, electric car 40, and charger 21 (S12). Authenticator 14 authenticates electric car 40 and the user and, when the authentication is completed, transmits a permission signal to charge to charger 21 connected to electric car 40, causing charger 21 to start charging. Power supply from charger 21 to electric car 40 is thus performed (S13).

If electric car 40 or the user is not authorized to use charger 21, authenticator 14 transmits a non-permission signal to charger 21. Hence, power supply from charger 21 to electric car 40 is not performed in Step S13.

If there is no need to authenticate the user and electric car 40, authenticator 14 may transmit the permission signal to charger 21 immediately after electric car 40 and charger 21 are connected in Step S11, causing charger 21 to start charging. If only one of the user or electric car 40 needs to be authenticated, authenticator 14 may transmit the permission signal to charge to charger 21 when the authentication of the one of the user or electric car 40 is completed, causing charger 21 to start charging.

Next, when the power supply is completed, charger 21 transmits charge information including a $CO_2$ emission amount per unit electric power amount and a charge electric power amount to emission amount management device 10, and emission amount management device 10 receives the charge information (S14). In Step S14, charger 21 transmits at least information indicating the $CO_2$ emission amount per unit electric power amount to emission amount management device 10.

Emission amount management device 10 executes a list update process of updating charge history information (list) based on the charge information (S17). The list update process in Step S17 will be described later.

Next, electric car 40 is disconnected from charger 21 (S15), and electric car 40 starts traveling (S16).

Next, when electric car 40 ends traveling, electric car 40 transmits first discharge information including a discharge electric power amount during traveling to emission amount management device 10, and emission amount management device 10 receives the first discharge information (S18). Electric car 40 may transmit the first discharge information to emission amount management device 10, for example, when the motor is stopped.

Emission amount management device 10 executes a list update process of updating the charge history information (list) based on the first discharge information (S19). The list update process in Step S19 will be described later.

For example, emission amount management device 10 obtains charge information each time power supply by charger 21 or 31 is completed, and obtains first discharge information each time traveling is completed. The timings of obtaining these information are, however, not limited to such.

Figure 8:
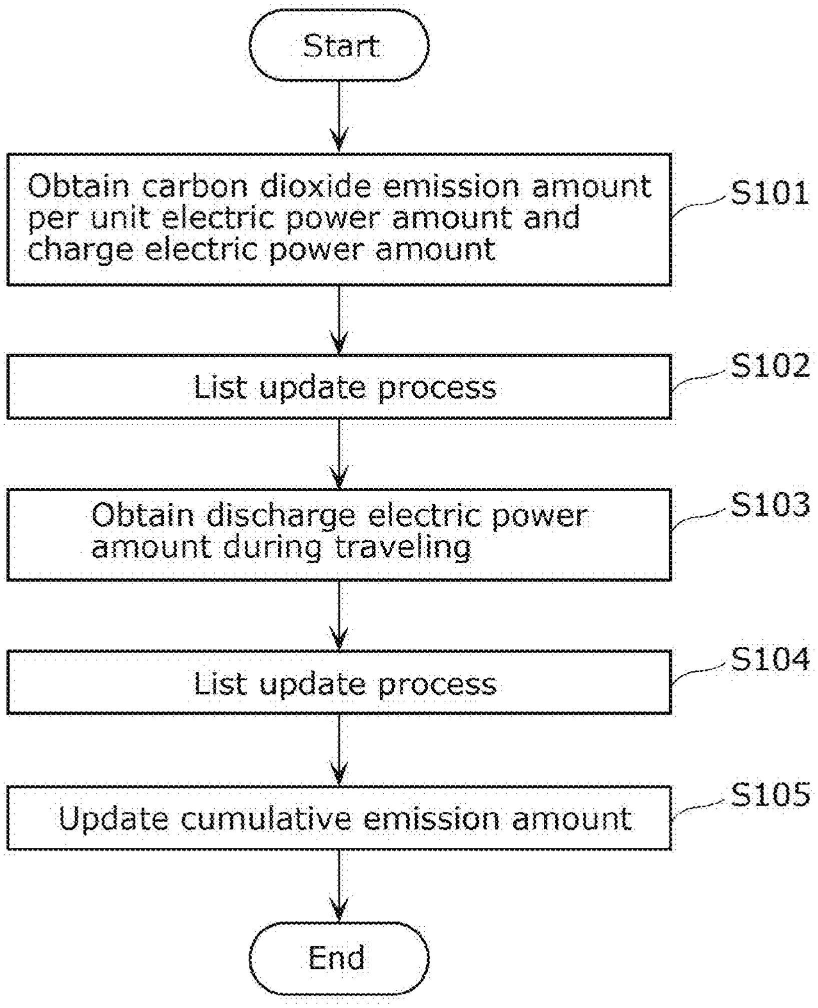
FIG. 8 is a flowchart illustrating the operation of the emission amount management device according to Embodiment 1.

Next, the operation of emission amount management device 10 will be described with reference to FIG. 8. FIG. 8 is a flowchart illustrating the operation (emission amount management method) of emission amount management device 10 according to this embodiment.

First, when power supply to electric car 40 is completed, first obtainer 11 in emission amount management device 10 obtains a $CO_2$ emission amount per unit electric power amount of electric power supplied and a charge electric power amount from charger 21 (S101). Step S101 corresponds to Step S14 in FIG. 7.

FIG. 9 is a diagram illustrating charge information obtained in Step S101 in FIG. 8.

In the example in FIG. 9, the charge information includes a vehicle ID "AAAAA", a $CO_2$ emission amount per unit electric power amount "0.000300 t/kWh", and a charge electric power amount "4 kWh". This means that electric car 40 with the vehicle ID "AAAAA" was charged with 4 kWh of electric power whose $CO_2$ emission amount per unit electric power amount is 0.000300 t/kWh.

Referring again to FIG. 8, next, manager 13 executes a list update process based on the charge information obtained in Step S101 (S102). Manager 13 executes a process of adding the $CO_2$ emission amount per unit electric power amount and the charge electric power amount indicated in the charge information to the charge history information. Step S102 corresponds to Step S17 in FIG. 7. Manager 13 functions as an updater that updates the charge history information.

FIG. 10 is a diagram for explaining the list update process executed in Step S102 in FIG. 8. FIG. 10 illustrates information (updated charge history information) resulting from adding the charge information obtained in Step S101 to the charge history information illustrated in FIG. 5. In order to clarify which information has been added, the word "added" is written to the right of the added information. The "date and time" is omitted in the charge history information illustrated in FIG. 10.

As illustrated in FIG. 10, manager 13 updates the charge history information by adding the charge information illustrated in FIG. 9 to the charge history information illustrated in FIG. 5. Manager 13 may update the charge history information so that the charge electric power amount for each $CO_2$ emission amount per unit electric power amount can be known, for example. For example, if charge information in which the vehicle ID is "AAAAA", the $CO_2$ emission amount per unit electric power amount is "0.000500 t/kWh", and the charge electric power amount is "4 kWh" is obtained in Step S101, manager 13 may update the charge history information by changing the charge electric power amount "6 kWh" in FIG. 5 to "10 kWh", that is, by adding "4 kWh" to "6 kWh".

Thus, manager 13 may update the charge history information by combining data with the same $CO_2$ emission amount per unit electric power amount. For example, manager 13 may manage the amount of electric power with which electric car 40 has been charged, for each power generation source.

The update may also include rearranging the pairs of $CO_2$ emission amounts per unit electric power amount and charge electric power amounts. For example, the update may include rearranging the pairs of $CO_2$ emission amounts per unit electric power amount and charge electric power amounts in ascending order of either the $CO_2$ emission amounts per unit electric power amount or the charge electric power amounts.

The list update process may include adding information indicated by the charge information to the charge history information (e.g. adding the information to the bottom row), adding the charge electric power amount among the information indicated by the charge information to the corresponding charge electric power amount in the charge history information, and so on.

Since the electric power with which electric car 40 has been charged is not yet used for traveling at the time of Step S102, manager 13 does not update the cumulative emission amount and the first discharge history information at the time of Step S102.

Referring again to FIG. 8, when electric car 40 ends traveling, second obtainer 12 in emission amount management device 10 obtains a discharge electric power amount during traveling from electric car 40 (S103). Step S103 corresponds to Step S18 in FIG. 7.

FIG. 11 is a diagram illustrating first discharge information obtained in Step S103 in FIG. 8.

In the example in FIG. 11, the first discharge information includes a vehicle ID "AAAAA", a travel distance "28 km", and a discharge electric power amount "4 kWh". This means that electric car 40 with the vehicle ID "AAAAA" traveled a distance of 28 km and discharged 4 kWh of electric power during the traveling. The electricity consumption during the traveling is 7 km/kWh.

If the electric vehicle is a hybrid car or the like, second obtainer 12 may further obtain a gasoline use amount during traveling from the electric vehicle in Step S103.

Referring again to FIG. 8, next, manager 13 executes a list update process based on the first discharge information obtained in Step S103 (S104). Manager 13 executes a process of subtracting the electric power amount indicated by the discharge electric power amount during traveling included in the first discharge information from the charge history information. Manager 13 selects at least one $CO_2$ emission amount per unit electric power amount from among a plurality of $CO_2$ emission amounts per unit electric power amount included in the charge history information based on a predetermined condition, and updates the charge history information based on the first discharge information and the charge electric power amount (or amounts) corresponding to the selected at least one $CO_2$ emission amount per unit electric power amount. Manager 13 functions as an updater that updates the charge history information.

The predetermined condition is to select the $CO_2$ emission amount per unit electric power amount and charge electric power amount to be assigned to the discharge electric power amount during traveling included in the first discharge information in ascending order of the $CO_2$ emission amounts per unit electric power amount, but is not limited to such. The predetermined condition may be to perform assignment in descending order of the $CO_2$ emission amounts per unit electric power amount, or to perform assignment in chronological order or reverse chronological order of the dates and times. Step S104 corresponds to Step S19 in FIG. 7.

FIG. 12 is a diagram for explaining the list update process executed in Step S104 in FIG. 8. FIG. 12 illustrates information (updated charge history information) resulting from adding the first discharge information obtained in Step S103 to the charge history information illustrated in FIG. 5. FIG. 12 illustrates an example in which the predetermined condition is to select the $CO_2$ emission amount per unit electric power amount and charge electric power amount to be assigned to the discharge electric power amount during traveling included in the first discharge information in ascending order of the $CO_2$ emission amounts per unit electric power amount.

In order to clarify which information has been deleted or changed, the word "deleted" is written to the right of the deleted information with strike-through, and the change of the numerical value is written to the right of the part where the numerical value has been updated. FIG. 12 illustrates an example in which the discharge electric power amount during traveling illustrated in FIG. 11 is subtracted from the charge history information illustrated in FIG. 5, for convenience sake. The "date and time" is omitted in the charge history information illustrated in FIG. 12.

As illustrated in FIG. 12, manager 13 subtracts "3 kWh" from the charge electric power amount corresponding to the vehicle ID "AAAAA" and the $CO_2$ emission amount per unit electric power amount "0.000000 t/kWh", and subtracts the remaining "1 kWh" from the charge electric power amount corresponding to the vehicle ID "AAAAA" and the $CO_2$ emission amount per unit electric power amount "0.000500 t/kWh". The charge electric power amount corresponding to the vehicle ID "AAAAA" and the $CO_2$ emission amount per unit electric power amount "0.000500 t/kWh" is changed from "6 kWh" to "5 kWh". Manager 13 deletes the electric power-related information whose charge electric power amount has become zero, from the charge history information.

Since the charge history information is updated by manager 13, all charge history may be stored in storage 15 separately from the charge history information (list).

Referring again to FIG. 8, next, manager 13 updates the cumulative $CO_2$ emission amount of electric car 40 with the vehicle ID "AAAAA" based on the charge electric power amount deleted or subtracted from the charge history information and the corresponding $CO_2$ emission amount per unit electric power amount (S105). Manager 13 adds the $CO_2$ emission amount obtained by multiplying the deleted or subtracted charge electric power amount by the corresponding $CO_2$ emission amount per unit electric power amount, to the cumulative emission amount stored in storage 15. In the example in FIG. 12, manager 13 adds 0.0005 t, which is the sum of "0.000500 t/kWh×1 kWh" and "0.000000 t/kWh×3 kWh", to 0.15 t, which is the cumulative emission amount stored in storage 15. The updated cumulative emission amount is 0.1505 t. Manager 13 functions as a calculator that calculates the $CO_2$ emission amount or the cumulative emission amount. In other words, emission amount management device 10 functions as an emission amount calculation device.

FIG. 13 is a diagram for explaining cumulative emission amount updating executed in Step S105 in FIG. 8.

As illustrated in FIG. 13, the cumulative emission amount stored in storage 15 is updated from 0.15 t to 0.1505 t in Step S105. Thus, the cumulative emission amount is updated using the amount of electric power actually used by electric car 40 during traveling. Emission amount management device 10 can therefore calculate the cumulative emission amount more accurately.

If the electric vehicle is a hybrid car or the like, manager 13 may further calculate the $CO_2$ emission amount of the engine during traveling from the gasoline use amount, and add the calculated $CO_2$ emission amount to the cumulative emission amount. Manager 13 stores a conversion coefficient for converting a gasoline use amount to a $CO_2$ emission amount, and can calculate the $CO_2$ emission amount from the gasoline use amount and the conversion coefficient. The $CO_2$ emission amount of the engine is the amount of $CO_2$ directly emitted by the electric vehicle during traveling, and is, for example, the amount of $CO_2$ contained in the exhaust gas.

In Step S105, manager 13 may further calculate the $CO_2$ emission amount per unit distance by adding the travel distance to the cumulative travel distance and dividing the cumulative emission amount by the cumulative travel distance. Manager 13 may store the history of the calculated $CO_2$ emission amount per unit distance in storage 15. Manager 13 may present the calculated $CO_2$ emission amount per unit distance to the driver of electric car 40, or may transmit the calculated $CO_2$ emission amount per unit distance to external system 50.

If the emission amount per unit distance is greater than a predetermined value, manager 13 may preferentially display, on a display, each charge location where the $CO_2$ emission amount per unit electric power amount is less than or equal to a predetermined amount. The display is a display device mounted on electric car 40, and may be included in a navigation device, for example. Alternatively, the display may be included in an information terminal such as a smartphone carried by the driver or passenger. The charge location is, for example, a location where a charger capable of charging electric power whose $CO_2$ emission amount per unit electric power amount is less than or equal to the predetermined amount is installed. Preferential display may be, for example, to highlight the charger capable of charging electric power whose $CO_2$ emission amount per unit electric power amount is less than or equal to the predetermined amount.

[1-3. Effects, Etc.]

As described above, emission amount management device 10 according to this embodiment is an emission amount management device that manages a carbon dioxide ($CO_2$) emission amount related to traveling of electric car 40

(an example of an electric vehicle), the emission amount management device including: first obtainer 11 that obtains charge information including information indicating a $CO_2$ emission amount per unit electric power amount of electric power with which electric car 40 is charged and a charge electric power amount; second obtainer 12 that obtains first discharge information including a first discharge electric power amount consumed by electric car 40 during the traveling; and manager 13 that selects, from charge history information (an example of history information) including a history of the $CO_2$ emission amount per unit electric power amount and the charge electric power amount, the $CO_2$ emission amount per unit electric power amount and the charge electric power amount to be assigned to the first discharge electric power amount, and calculates the $CO_2$ emission amount from the $CO_2$ emission amount per unit electric power amount selected and the first discharge electric power amount.

For example, if electric car 40 is charged with a plurality of electric powers that differ in the $CO_2$ emission amount per unit electric power amount, the use of a uniform $CO_2$ emission amount per unit electric power amount may make it impossible to accurately calculate the $CO_2$ emission amount. Emission amount management device 10 selects, from the charge history information, the $CO_2$ emission amount per unit electric power amount and charge electric power amount used when calculating the $CO_2$ emission amount during traveling, so that the $CO_2$ emission amount can be calculated more accurately than when a uniform $CO_2$ emission amount per unit electric power amount is used. Hence, emission amount management device 10 can calculate the $CO_2$ emission amount related to traveling of electric car 40 more accurately than when the $CO_2$ emission amount per unit electric power amount used when calculating the $CO_2$ emission amount during traveling is not selected from the charge history information. This leads to more accurate management of the $CO_2$ emission amount by emission amount management device 10.

Moreover, manager 13 executes a process of updating the charge history information based on the first discharge electric power amount and the $CO_2$ emission amount per unit electric power amount and the charge electric power amount selected.

In this way, manager 13 can update the history information when the electric vehicle is charged and discharged. The updated charge history information contributes to more accurate management of the $CO_2$ emission amount related to traveling of electric car 40.

Moreover, the charge history information includes a plurality of pairs of $CO_2$ emission amounts per unit electric power amount and charge electric power amounts, and manager 13 selects the $CO_2$ emission amount per unit electric power amount and the charge electric power amount to be assigned to the first discharge electric power amount, in ascending order of the $CO_2$ emission amounts per unit electric power amount in the charge history information.

In this way, manager 13 can manage the $CO_2$ emission amount during traveling of electric car 40 as a smaller value.

Moreover, second obtainer 12 further obtains a travel distance traveled by electric car 40 during the traveling, and manager 13 adds the travel distance obtained to a cumulative travel distance that is an integrated value of travel distances, adds the $CO_2$ emission amount calculated to a cumulative emission amount that is an integrated value of $CO_2$ emission amounts, and divides the cumulative emission amount to which the $CO_2$ emission amount is added by the cumulative travel distance to which the travel distance is added to calculate a $CO_2$ emission amount per unit distance.

In this way, manager 13 can calculate the $CO_2$ emission amount per unit distance of electric car 40. For example, the $CO_2$ emission amount per unit distance is presented to the driver or transmitted to external system 50, thus visualizing the $CO_2$ emission amount.

Moreover, when the $CO_2$ emission amount per unit distance is greater than a predetermined value, manager 13 preferentially displays a charge location where the $CO_2$ emission amount per unit electric power amount is less than or equal to a predetermined amount.

In this way, manager 13 can urge the driver to reduce the $CO_2$ emission amount per unit distance of electric car 40. This contributes to the driver achieving more environmentally friendly driving.

Moreover, the electric vehicle further includes an engine as a drive source, second obtainer 12 obtains a gasoline use amount of the electric vehicle during the traveling, and manager 13 calculates a $CO_2$ emission amount of the engine during the traveling from the gasoline use amount obtained, and adds the $CO_2$ emission amount calculated to the cumulative emission amount.

In this way, for example when the electric vehicle is a hybrid car including a motor and an engine as a drive source, emission amount management device 10 can calculate the amount of $CO_2$ emitted when gasoline is used (i.e. the amount of $CO_2$ actually emitted from the electric vehicle during traveling). Thus, emission amount management device 10 can more accurately calculate the $CO_2$ emission amount related to traveling of electric car 40.

As described above, each of chargers 21 and 31 (an example of a charging device) according to this embodiment, when charging electric car 40, transmits information indicating a $CO_2$ emission amount per unit electric power amount of electric power with which electric car 40 is charged and a charge electric power amount to emission amount management device 10 described above.

In this way, each of chargers 21 and 31 can transmit, to emission amount management device 10, information for more accurately calculating the $CO_2$ emission amount related to traveling of electric car 40. This contributes to emission amount management device 10 more accurately calculating the $CO_2$ emission amount related to traveling of electric car 40.

As described above, an emission amount management method according to this embodiment is an emission amount management method of managing a $CO_2$ emission amount related to traveling of electric car 40 (an example of an electric vehicle), the emission amount management method including: obtaining charge information including information indicating a $CO_2$ emission amount per unit electric power amount of electric power with which the electric vehicle is charged and a charge electric power amount (S101); obtaining discharge information including a discharge electric power amount consumed by electric car 40 during the traveling (S103); and selecting, from charge history information including a history of the $CO_2$ emission amount per unit electric power amount and the charge electric power amount, the $CO_2$ emission amount per unit electric power amount and the charge electric power amount to be assigned to the discharge electric power amount, and calculating the $CO_2$ emission amount from the $CO_2$ emission amount per unit electric power amount selected and the discharge electric power amount (S105).

This achieves the same effects as emission amount management device 10 described above.

Embodiment 2

An emission amount management device according to this embodiment will be described below with reference to FIGS. 14 to 19. The following will mainly describe the differences from Embodiment 1 while omitting or simplifying the description of the same or similar contents as or to Embodiment 1.

[2-1. Structure of Emission Amount Management Device]

Figure 14:
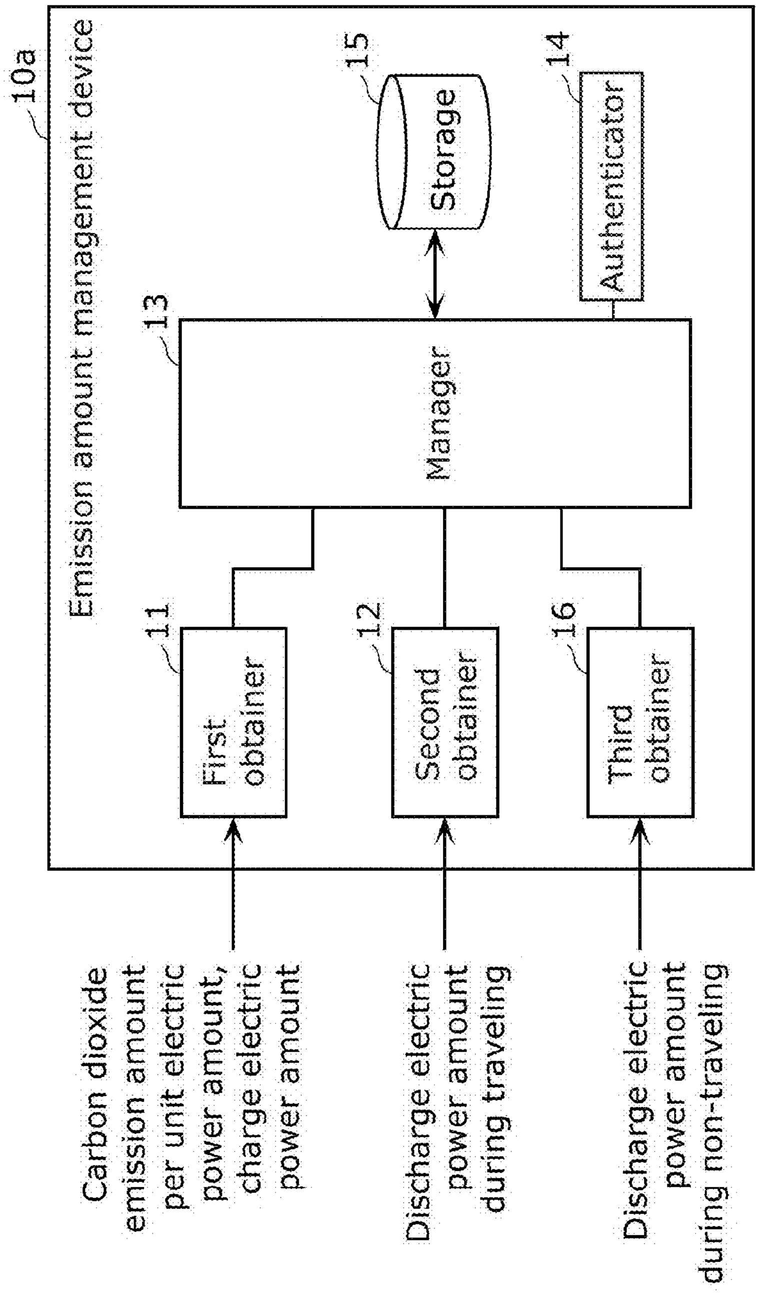
FIG. 14 is a block diagram illustrating the functional structure of an emission amount management device according to Embodiment 2.

First, the structure of the emission amount management device according to this embodiment will be described with reference to FIG. 14. FIG. 14 is a block diagram illustrating the functional structure of emission amount management device 10*a* according to this embodiment. Emission amount management device 10*a* according to this embodiment differs from emission amount management device 10 according to Embodiment 1 in that it includes third obtainer 16.

As illustrated in FIG. 14, emission amount management device 10*a* includes third obtainer 16 in addition to the structure of emission amount management device 10 according to Embodiment 1. In this embodiment, an example will be described in which electric car 40 discharges electric power to a facility or the like via charger-discharger 22 (see FIG. 17).

Third obtainer 16 obtains the amount of electric power discharged when electric car 40 is not traveling. Third obtainer 16 obtains discharge-related information when electric car 40 discharges electric power to a facility or the like, from charger-discharger 22. Third obtainer 16 includes a communication circuit (communication module). The communication circuit (communication module) may be one communication circuit common to first obtainer 11, second obtainer 12, and third obtainer 16.

FIG. 15 is a diagram illustrating the format of information (information related to discharge during non-traveling of electric car 40) obtained by third obtainer 16 according to this embodiment. Herein, "during non-traveling" means when electric car 40 is not traveling.

As illustrated in FIG. 15, the information obtained by third obtainer 16 includes second discharge information in which the vehicle ID of electric car 40 that discharges when not traveling and a discharge electric power amount during non-traveling are associated with each other. The discharge electric power amount during non-traveling is the amount of electric power discharged when electric car 40 is not traveling, and is an example of a second discharge electric power amount. The discharge electric power amount during non-traveling is, for example, the amount of electric power discharged via charger-discharger 22, but is not limited to such.

Various data stored in storage 15 according to this embodiment will be described with reference to FIG. 16. FIG. 16 is a diagram illustrating second discharge history information (discharge electric power amount data) stored in storage 15 according to this embodiment. Storage 15 according to this embodiment stores the data illustrated in FIG. 16 in addition to the data stored in storage 15 according to Embodiment 1.

Third obtainer 16 may, instead of obtaining the vehicle ID, identify the vehicle ID from the ID of the user obtained by authenticator 14 and association information between the ID of the user and the vehicle ID stored in storage 15 in advance. Moreover, if manager 13 cannot obtain the vehicle ID, manager 13 may manage each item of history information (e.g. second discharge history information) by the ID of the user instead of the vehicle ID.

As illustrated in FIG. 16, storage 15 stores second discharge history information in which a vehicle ID, a date and time, and a discharge electric power amount (discharge electric power amount during non-traveling) are associated with each other. The date and time are, for example, the date and time when electric car 40 discharged without traveling. The date and time may include the discharge start time and the discharge end time. The discharge electric power amount during non-traveling indicates the amount of electric power discharged when not traveling. Storage 15 stores the second discharge history information separately from the first discharge history information. For example, storage 15 may have separate tables for the first discharge history information and the second discharge history information, or may have the same table with the first discharge history information and the second discharge history information distinguished from each other by setting the travel distance of the second discharge history information to 0 km.

[2-2. Operation of Emission Amount Management System]

Figure 17:
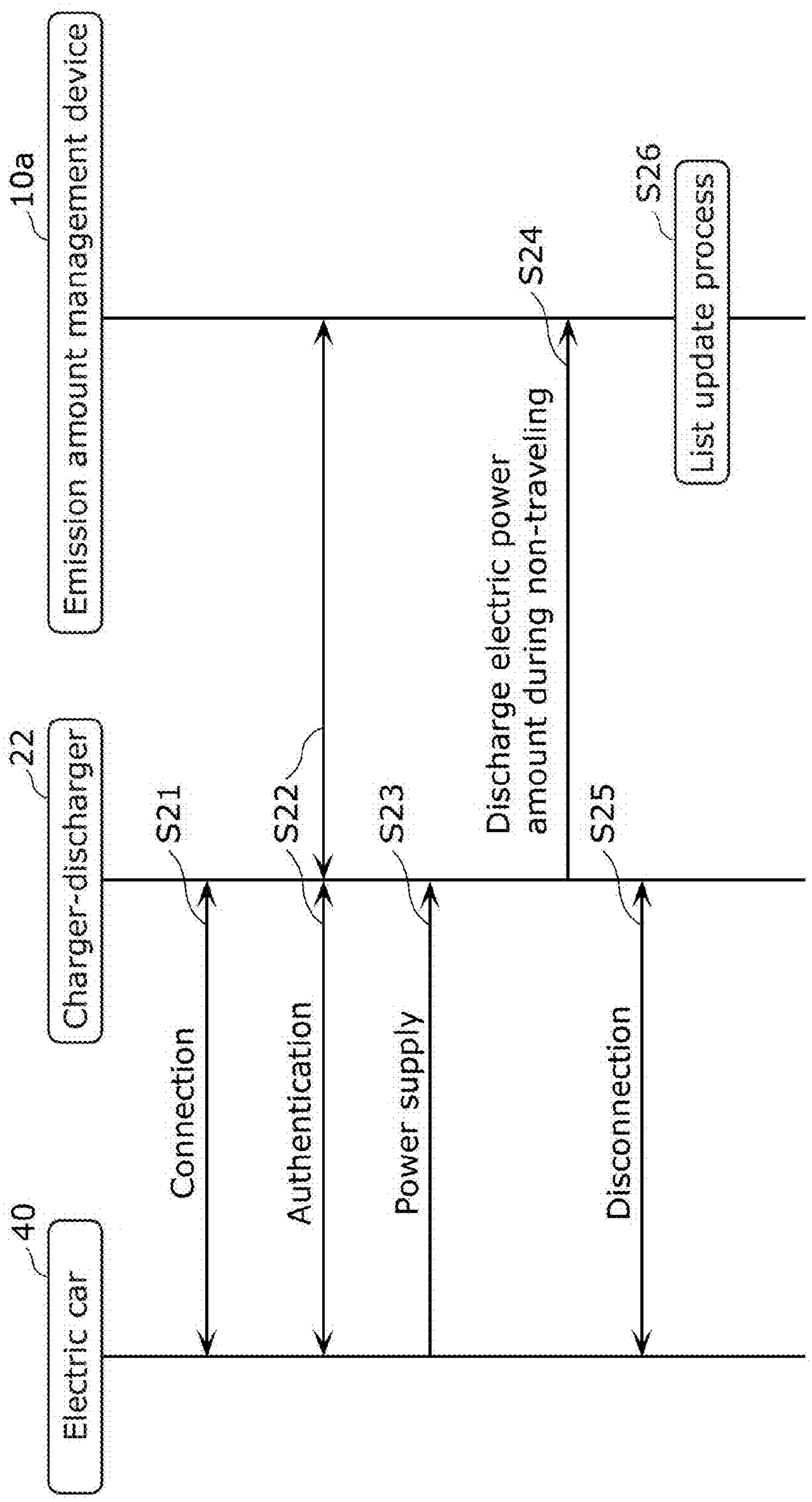
FIG. 17 is a sequence diagram illustrating the operation of an emission amount management system according to Embodiment 2.

Next, the operation of the emission amount management system including emission amount management device 10*a* having the above-described structure will be described with reference to FIGS. 17 to 22B. FIG. 17 is a sequence diagram illustrating the operation (emission amount management method) of the emission amount management system according to this embodiment. FIG. 17 illustrates an example in which electric car 40 is connected to charger-discharger 22. Steps S21 and S22 are the same processes as Steps S11 and S12 in FIG. 7, and their description will be omitted.

As illustrated in FIG. 17, after the authentication is completed, electric car 40 supplies power to charger-discharger 22 (S23). Electric power from electric car 40 is supplied to a facility or power grid to be supplied with electric power, via charger-discharger 22. Charger-discharger 22 measures the amount of electric power supplied from electric car 40.

Next, when the power supply is completed, charger-discharger 22 transmits second discharge information including a discharge electric power amount during non-traveling to emission amount management device 10*a*, and emission amount management device 10*a* receives the second discharge information (S24).

When electric car 40 discharges electric power to charger-discharger 22, the cumulative emission amount during traveling illustrated in FIG. 4 is not updated, but a discharge cumulative emission amount separate from the cumulative emission amount may be managed and updated.

FIG. 18 is a diagram illustrating second discharge information obtained in Step S24 in FIG. 17.

In the example in FIG. 18, third obtainer 16 obtains second discharge information including a vehicle ID of "AAAAA" and a discharge electric power amount during non-traveling of "5 kWh" in Step S24. Since electric car 40 is stopped traveling, the second discharge information does not need to include the travel distance of electric car 40.

Referring again to FIG. 17, next, electric car 40 is disconnected from charger-discharger 22 (S25).

Next, emission amount management device 10*a* executes a list update process of updating the charge history information (list) based on the second discharge information (S26). Manager 13 in emission amount management device 10*a* executes a process of subtracting the electric power amount indicated by the discharge electric power amount during non-traveling included in the second discharge information from the charge history information. Manager 13 selects at least one $CO_2$ emission amount per unit electric power amount from among a plurality of $CO_2$ emission amounts per unit electric power amount included in the charge history information based on a predetermined condition, and updates (by subtraction in this example) the charge history information based on the second discharge information and the charge electric power amount (or amounts) corresponding to the selected at least one $CO_2$ emission amount per unit electric power amount.

The predetermined condition may be to select the $CO_2$ emission amount per unit electric power amount and charge electric power amount to be assigned to the discharge electric power amount during non-traveling included in the second discharge information in descending order of the $CO_2$ emission amounts per unit electric power amount. In other words, the predetermined condition may be different (e.g. opposite) between discharge during traveling and discharge during non-traveling.

The predetermined condition is not limited to such, and may be to perform assignment in ascending order of the $CO_2$ emission amounts per unit electric power amount, or to perform assignment in chronological order or reverse chronological order of the dates and times.

FIG. 19 is a diagram for explaining the list update process executed in Step S26 in FIG. 17. FIG. 19 illustrates information (updated charge history information) resulting from subtracting the discharge electric power amount during non-traveling included in the second discharge information obtained in Step S24 from the charge history information in which the vehicle ID "AAAAA" is associated with the $CO_2$ emission amount per unit electric power amount "0.000500 t/kWh" and the charge electric power amount "5 kWh" and associated with the $CO_2$ emission amount per unit electric power amount "0.000000 t/kWh" and the charge electric power amount "3 kWh". FIG. 19 illustrates an example in which the predetermined condition is to select the $CO_2$ emission amount per unit electric power amount and charge electric power amount to be assigned to the discharge electric power amount during non-traveling included in the second discharge information in descending order of the $CO_2$ emission amounts per unit electric power amount.

In order to clarify which information has been deleted, the word "deleted" is written to the right of the deleted information with strike-through.

As illustrated in FIG. 19, manager 13 subtracts "5 kWh" from the charge electric power amount corresponding to the vehicle ID "AAAAA" and the $CO_2$ emission amount per unit electric power amount "0.000500 t/kWh", i.e. from the charge electric power amount in ascending order of the $CO_2$ emission amounts per unit electric power amount.

Although the above describes an example in which electric car 40 supplies (discharges) electric power to a facility, for example, electric power may be supplied from one electric car 40 to other electric car 40, that is, electric power may be interchanged between vehicles. The calculation of the cumulative emission amount when electric power is interchanged between vehicles will be described below with reference to FIGS. 20A to 22B.

FIG. 20A is a diagram illustrating charge history information (charge electric power amount data) for a first vehicle to explain power interchange between vehicles. FIG. 20B is a diagram illustrating charge history information (charge electric power amount data) for a second vehicle to explain power interchange between vehicles. The first vehicle is to be provided with electric power (i.e. to be charged), and the second vehicle is to provide electric power (i.e. to discharge). The first vehicle and the second vehicle are, for example, electric cars.

In the charge history information of the first vehicle, the vehicle ID "AAAAA", the $CO_2$ emission amount per unit electric power amount "0.000500 t/kWh", and the charge electric power amount "1 kWh" are associated with each other, as illustrated in FIG. 20A.

In the charge history information of the second vehicle, the vehicle ID "BBBBB", the $CO_2$ emission amount per unit electric power amount "0.000300 t/kWh", and the charge electric power amount "5 kWh" are associated with each other and the vehicle ID "BBBBB", the $CO_2$ emission amount per unit electric power amount "0.000000 t/kWh", and the charge electric power amount "2 kWh" are associated with each other, as illustrated in FIG. 20B.

An example will be described in which 5 kWh of electric power is supplied from the second vehicle to the first vehicle. As a result of the first vehicle being connected to a charger or a charger-discharger and the second vehicle being connected to a charger-discharger, electric power can be provided from the second vehicle to the first vehicle. Alternatively, for example, the first vehicle and the second vehicle may be directly connected to each other for electric power interchange.

FIG. 21A is a diagram illustrating electric power amount data (charge information) of electric power which the first vehicle has been provided from the second vehicle. The data illustrated in FIG. 21A is charge information for the first vehicle, which is transmitted to first obtainer 11 from the charger or charger-discharger to which the first vehicle is connected. FIG. 21B is a diagram illustrating electric power amount data (second discharge information) of electric power which the second vehicle has provided to the first vehicle. The electric power amount data illustrated in FIG. 21B is information transmitted to third obtainer 16 from the charger-discharger to which the second vehicle is connected.

Emission amount management device 10*a* updates the charge history information of the first vehicle based on the information illustrated in FIG. 21A, and updates the charge history information of the second vehicle based on the information illustrated in FIG. 21B.

FIG. 22A is a diagram for explaining a list update process for the first vehicle. In order to clarify which information has been added, the word "added" is written to the right of the added information. The "date and time" is omitted in the charge history information illustrated in FIG. 22A.

As illustrated in FIG. 22A, manager 13 updates the charge history information of the first vehicle by adding the charge electric power amount included in the charge information illustrated in FIG. 21A to the charge history information illustrated in FIG. 20A. This is the same process as when the first vehicle is charged with electric power from a retail electricity supplier or the like.

FIG. 22B is a diagram for explaining a list update process for the second vehicle. In order to clarify which information has been deleted, the word "deleted" is written to the right of the deleted information with strike-through. The "date and time" is omitted in the charge history information illustrated in FIG. 22B.

As illustrated in FIG. 22B, manager 13 updates the charge history information of the second vehicle by subtracting the discharge electric power amount during non-traveling included in the second discharge information illustrated in FIG. 21B from the charge history information illustrated in FIG. 20B. For example, manager 13 may select, from the charge history information of the second vehicle, the $CO_2$ emission amount per unit electric power amount and charge electric power amount to be assigned to the discharge electric power amount during non-traveling provided to the first vehicle, and update the selected $CO_2$ emission amount per unit electric power amount and charge electric power amount.

Although the different vehicle IDs are managed separately as illustrated in FIGS. 20A and 20B, FIGS. 21A and 21B, and FIGS. 22A and 22B for the sake of explanation, the different vehicle IDs need not necessarily be managed separately (i.e. in separate tables) and may be managed collectively (i.e. in one table).

The cumulative emission amount of the first vehicle is not updated just because the first vehicle is provided with electric power. The cumulative emission amount of the second vehicle is not updated just because the second vehicle provides electric power. Although the cumulative emission amount of the first vehicle and the cumulative emission amount of the second vehicle are not updated, a discharge cumulative emission amount separate from the cumulative emission amount may be managed and the discharge cumulative emission amount of the second vehicle may be updated.

[2-3. Effects, Etc.]

As described above, emission amount management device 10*a* according to this embodiment further includes: third obtainer 16 that obtains second discharge information including a second discharge electric power amount discharged when electric car 40 (an example of an electric vehicle) is not traveling. Manager 13 selects, from the charge history information (an example of history information), the carbon dioxide ($CO_2$) emission amount per unit electric power amount and the charge electric power amount to be assigned to the second discharge electric power amount, and updates the $CO_2$ emission amount per unit electric power amount and the charge electric power amount selected.

In this way, manager 13 can also manage the amount of electric power discharged by electric car 40 when not traveling, and therefore can more accurately calculate the $CO_2$ emission amount related to traveling of electric car 40 than when the amount of electric power discharged by electric car 40 when not traveling is not managed.

Moreover, the charge history information includes a plurality of pairs of $CO_2$ emission amounts per unit electric power amount and charge electric power amounts, and manager 13 selects the $CO_2$ emission amount per unit electric power amount and the charge electric power amount to be assigned to the second discharge electric power amount, in descending order of the $CO_2$ emission amounts per unit electric power amount in the charge history information.

In this way, emission amount management device 10*a* can update the charge history information so that electric car 40 preferentially supplies clean electric power to the outside.

Moreover, emission amount management device 10*a* further includes: authenticator 14 that performs authentication between electric car 40 and charger 21 or 31 or charger-discharger 22 connected to electric car 40, and, when the authentication is completed, authenticator 14 transmits a permission signal to charge, discharge, or charge and discharge to charger 21 or 31 or charger-discharger 22. When electric car 40 is charged, first obtainer 11 obtains the charge information from charger 21 or 31 or charger-discharger 22. When electric car 40 is discharged, third obtainer 16 obtains the second discharge information from charger 21 or 31 or charger-discharger 22.

In this way, emission amount management device 10*a* can obtain information for updating the charge history information when authentication by authenticator 14 is completed. In other words, the charge history information does not include information when authentication has not been performed. Such charge history information contributes to more accurate calculation of the $CO_2$ emission amount related to traveling of electric car 40.

Moreover, emission amount management device 10*a* further includes third obtainer 16 that obtains second discharge information including a second discharge electric power amount discharged when electric car 40 is not traveling, and charger-discharger 22 (an example of a charging device) transmits the second discharge information including the second discharge electric power amount discharged when the electric vehicle is not traveling, to emission amount management device 10*a*.

In this way, charger-discharger 22 can transmit, to emission amount management device 10*a*, information for more accurately calculating the $CO_2$ emission amount related to traveling of electric car 40. This contributes to emission amount management device 10*a* more accurately calculating the $CO_2$ emission amount related to traveling of electric car 40.

OTHER EMBODIMENTS

While an emission amount management device, etc. according to one or more aspects have been described above by way of embodiments, the present invention is not limited to such embodiments. Other modifications obtained by applying various changes conceivable by a person skilled in the art to the embodiments and any combinations of the structural elements in different embodiments without departing from the scope of the present invention are also included in the scope of the present invention.

For example, although each of the foregoing embodiments describes an example in which the emission amount management device is provided separately from the electric car, the present invention is not limited to such, and the emission amount management device may be mounted on the electric car.

Although each of the foregoing embodiments describes an example in which the charge information when the charger or charger-discharger supplies electric power to the electric vehicle is transmitted from the charger or charger-discharger to the emission amount management device, the present invention is not limited to such. For example, the electric vehicle supplied with electric power may transmit the charge information to the emission amount management device.

Although each of the foregoing embodiments describes an example in which the emission amount management device obtains the first discharge information during traveling from the electric vehicle, the present invention is not limited to such. For example, the emission amount management device may obtain the first discharge information from an external system (e.g. a server of the car manufacturer).

In the case where the $CO_2$ emission amount per unit electric power amount of electric power supplied changes over time, for example in the case where the seller or generator of the electric power supplied changes, the charger or charger-discharger in each of the foregoing embodiments may store each $CO_2$ emission amount per unit electric power amount in advance or obtain each $CO_2$ emission amount per unit electric power amount from the administrator of the emission amount management system, etc. If the charger or charger-discharger is installed in a residence, etc., the charger or charger-discharger may obtain, from a Home Energy Management Service (HEMS) controller, etc., information indicating the $CO_2$ emission amount per unit electric power amount of electric power currently suppliable.

The first discharge information in each of the foregoing embodiments may include position information or travel route information of the electric car instead of the travel distance.

The second discharge information in each of the foregoing embodiments may further include information (e.g. ID, installation position, etc.) indicating the charger-discharger.

The manager in each of the foregoing embodiments may include the storage.

Although each of the foregoing embodiments describes an example in which the manager directly updates the charge history information stored in the storage included in the emission amount management device as a process of updating the charge history information, the present invention is not limited to such. When the charge history information is stored in a storage device external to the emission amount management device, the manager may transmit an instruction to update the charge history information to the external storage device as a process of updating the charge history information.

These general and specific aspects may be implemented using a system, a method, an integrated circuit, a computer program, or a computer-readable non-transitory recording medium such as CD-ROM, or any combination of a system, a method, an integrated circuit, a computer program, and a recording medium. The program may be stored in the recording medium beforehand, or supplied to the recording medium via a wide area communication network such as the Internet.

Each structural element in each of the foregoing embodiments, etc. may be configured in the form of an exclusive hardware product, or may be implemented by executing a software program suitable for the structural element. Each structural element may be implemented by means of a program executing unit, such as a CPU or a processor, reading and executing the software program recorded on a recording medium such as a hard disk or semiconductor memory.

The order in which the steps are performed in each flowchart is an example provided for specifically describing the present invention, and order other than the above may be used. Part of the steps may be performed simultaneously (in parallel) with one or more other steps, and part of the steps may be omitted.

The division of the functional blocks in each block diagram is an example, and a plurality of functional blocks may be implemented as one functional block, one functional block may be divided into a plurality of functional blocks, or part of functions may be transferred to another functional block. Moreover, functions of a plurality of functional blocks having similar functions may be implemented by single hardware or software in parallel or in a time-sharing manner.

The emission amount management device according to each of the foregoing embodiments may be implemented as a single device or a plurality of devices. In the case where the emission amount management device is implemented by a plurality of devices, the structural elements in the emission amount management device may be assigned to the plurality of devices in any way. In the case where the emission amount management device is implemented by a plurality of devices, the communication method between the plurality of devices is not limited, and may be wireless communication or wired communication. The communication method may be a combination of wireless communication or wired communication.

The structural elements described in each of the foregoing embodiments may be implemented by software, and may be typically implemented by LSI which is an integrated circuit. The elements may each be individually implemented as one chip, or may be partly or wholly implemented on one chip. While description has been made regarding LSI, there are different names such as IC, system LSI, super LSI, and ultra LSI, depending on the degree of integration. The circuit integration technique is not limited to LSIs, and dedicated circuits (e.g. general-purpose circuits that execute dedicated programs) or general-purpose processors may be used to achieve the same. A field programmable gate array (FPGA) which can be programmed after manufacturing the LSI or a reconfigurable processor where circuit cell connections and settings within the LSI can be reconfigured may be used. Further, in the event of the advent of an integrated circuit technology which would replace LSIs by advance of semiconductor technology or a separate technology derived therefrom, such a technology may be used for integration of the elements.

A system LSI is a super-multifunctional LSI manufactured by integrating a plurality of processing units on a single chip, and specifically is a computer system including a microprocessor, read only memory (ROM), random access memory (RAM), and so forth. A computer program is stored in the ROM. The system LSI achieves its functions by the microprocessor operating according to the computer program.

One aspect of the present invention may be a computer program for causing a computer to execute each characteristic step included in the emission amount management method illustrated in any of FIGS. 7, 8, and 17.

For example, the program may be a program to be executed by a computer. One aspect of the present invention may be a non-transitory computer-readable recording medium having such a program recorded thereon. For example, the program may be recorded on a recording medium and distributed or circulated. For example, by installing the distributed program in another device including a processor and causing the processor to execute the program, the processes can be performed by the device.

ADDITIONAL NOTE

The above description of each embodiment discloses the following technologies.

Technology 1

An emission amount management device that manages a carbon dioxide emission amount related to traveling of an electric vehicle, the emission amount management device including: a first obtainer that obtains charge information including information indicating a carbon dioxide emission amount per unit electric power amount of electric power with which the electric vehicle is charged and a charge electric power amount; a second obtainer that obtains first discharge information including a first discharge electric power amount consumed by the electric vehicle during the traveling; and a manager that selects, from history information including a history of the carbon dioxide emission amount per unit electric power amount and the charge electric power amount, the carbon dioxide emission amount per unit electric power amount and the charge electric power amount to be assigned to the first discharge electric power amount, and calculates the carbon dioxide emission amount from the carbon dioxide emission amount per unit electric power amount selected and the first discharge electric power amount.

Technology 2

The emission amount management device according to technology 1, wherein the manager executes a process of updating the history information based on the first discharge electric power amount and the carbon dioxide emission amount per unit electric power amount and the charge electric power amount selected.

Technology 3

The emission amount management device according to technology 1 or 2, wherein the history information includes a plurality of pairs of carbon dioxide emission amounts per unit electric power amount and charge electric power amounts, and the manager selects the carbon dioxide emission amount per unit electric power amount and the charge electric power amount to be assigned to the first discharge electric power amount, in ascending order of the carbon dioxide emission amounts per unit electric power amount in the history information.

Technology 4

The emission amount management device according to any one of technology 1 to technology 3, further including: a third obtainer that obtains second discharge information including a second discharge electric power amount discharged when the electric vehicle is not traveling, wherein the manager selects, from the history information, the carbon dioxide emission amount per unit electric power amount and the charge electric power amount to be assigned to the second discharge electric power amount, and updates the carbon dioxide emission amount per unit electric power amount and the charge electric power amount selected.

Technology 5

The emission amount management device according to technology 4, wherein the history information includes a plurality of pairs of carbon dioxide emission amounts per unit electric power amount and charge electric power amounts, and the manager selects the carbon dioxide emission amount per unit electric power amount and the charge electric power amount to be assigned to the second discharge electric power amount, in descending order of the carbon dioxide emission amounts per unit electric power amount in the history information.

Technology 6

The emission amount management device according to any one of technology 1 to technology 5, wherein the second obtainer further obtains a travel distance traveled by the electric vehicle during the traveling, and the manager adds the travel distance obtained to a cumulative travel distance that is an integrated value of travel distances, adds the carbon dioxide emission amount calculated to a cumulative emission amount that is an integrated value of carbon dioxide emission amounts, and divides the cumulative emission amount to which the carbon dioxide emission amount is added by the cumulative travel distance to which the travel distance is added to calculate a carbon dioxide emission amount per unit distance.

Technology 7

The emission amount management device according to technology 6, wherein when the carbon dioxide emission amount per unit distance is greater than a predetermined value, the manager preferentially displays a charge location where the carbon dioxide emission amount per unit electric power amount is less than or equal to a predetermined amount.

Technology 8

The emission amount management device according to any one of technology 1 to technology 7, wherein the electric vehicle further includes an engine as a drive source, the second obtainer obtains a gasoline use amount of the electric vehicle during the traveling, and the manager calculates a carbon dioxide emission amount of the engine during the traveling from the gasoline use amount obtained, and adds the carbon dioxide emission amount calculated to the cumulative emission amount.

Technology 9

The emission amount management device according to technology 4 or technology 5, further including: an authenticator that performs authentication between the electric vehicle and a charger or a charger-discharger connected to the electric vehicle, wherein when the authentication is completed, the authenticator transmits a permission signal to charge, discharge, or charge and discharge to the charger or the charger-discharger, when the electric vehicle is charged, the first obtainer obtains the charge information from the charger or the charger-discharger, and when the electric vehicle is discharged, the third obtainer obtains the second discharge information from the charger or the charger-discharger.

Technology 10

A charging device that, when charging an electric vehicle, transmits a carbon dioxide emission amount per unit electric power amount of electric power with which the electric vehicle is charged and a charge electric power amount to the emission amount management device according to any one of technology 1 to technology 9.

Technology 11

The charging device according to technology 10, wherein the emission amount management device further includes a third obtainer that obtains second discharge information including a second discharge electric power amount discharged when the electric vehicle is not traveling, and the charging device transmits the second discharge information including the second discharge electric power amount discharged when the electric vehicle is not traveling, to the emission amount management device.

Technology 12

An emission amount management method of managing a carbon dioxide emission amount related to traveling of an electric vehicle, the emission amount management method including: obtaining charge information including information indicating a carbon dioxide emission amount per unit electric power amount of electric power with which the electric vehicle is charged and a charge electric power amount; obtaining discharge information including a discharge electric power amount consumed by the electric vehicle during the traveling; and selecting, from history information including a history of the carbon dioxide emission amount per unit electric power amount and the charge electric power amount, the carbon dioxide emission amount per unit electric power amount and the charge electric power amount to be assigned to the discharge electric power amount, and calculating the carbon dioxide emission amount from the carbon dioxide emission amount per unit electric power amount selected and the discharge electric power amount.

REFERENCE SIGNS LIST

1 emission amount management system
10, 10*a* emission amount management device
11 first obtainer
12 second obtainer
13 manager
14 authenticator
16 third obtainer
21, 31 charger (charging device)
22 charger-discharger (charging device)
40 electric car (electric vehicle)

The invention claimed is:

1. An emission amount management device that manages a carbon dioxide emission amount related to traveling of an electric vehicle, the emission amount management device comprising a processor configured to perform operations comprising:

obtaining charge information including information indicating a carbon dioxide emission amount per unit electric power amount of electric power with which the electric vehicle is charged in a particular charging session and a charge electric power amount in the particular charging session;

obtaining first discharge information including a first discharge electric power amount consumed by the electric vehicle during the traveling;

selecting, from history information including a plurality of pairs each associating, for each charging event corresponding to a particular charging session, the carbon dioxide emission amount per unit electric power amount in the charging event with a remaining charge electric power amount that is the charge electric power amount after charging in the charging event, at least one pair to be assigned to at least part of the first discharge electric power amount, and calculating the carbon dioxide emission amount from the carbon dioxide emission amount per unit electric power amount of the at least one pair selected and the first discharge electric power amount;

performing, on the at least one pair selected, a dynamic history update process of:

updating the remaining charge electric power amount of the at least one pair selected by subtracting, from the remaining charge electric power amount, a discharge electric power amount assigned to the at least one pair selected, the discharge electric power amount assigned to the at least one pair selected being all or part of the first discharge electric power amount;

when the remaining charge electric power amount is zero after the updating, deleting the at least one pair selected from the history information;

obtaining a travel distance traveled by the electric vehicle during the particular travel segment;

adding the travel distance obtained to a cumulative travel distance that is an integrated value of travel distances, adding the carbon dioxide emission amount calculated to a cumulative emission amount that is an integrated value of carbon dioxide emission amounts, and dividing the cumulative emission amount to which the carbon dioxide emission amount has been added by the cumulative travel distance to which the travel distance has been added to calculate a carbon dioxide emission amount per unit distance; and when the carbon dioxide emission amount per unit distance is greater than a predetermined value, transmitting, to a display device of the electric vehicle, a display signal for preferentially displaying a charge location where the carbon dioxide emission amount per unit electric power amount is less than or equal to a predetermined amount.

2. The emission amount management device according to claim 1, wherein the operations further comprise executing a process of updating the history information based on the first discharge electric power amount and the carbon dioxide emission amount per unit electric power amount and the charge electric power amount selected.

3. The emission amount management device according to claim 1, wherein the selecting the pair comprises selecting the pair to be assigned to the first discharge electric power amount in ascending order of the carbon dioxide emission amounts per unit electric power amount among the plurality of pairs in the history information.

4. The emission amount management device according to claim 1, wherein the operations further comprise:

obtaining second discharge information including a second discharge electric power amount discharged when the electric vehicle is not traveling, and selecting, from the history information, the carbon dioxide emission amount per unit electric power amount and the charge electric power amount to be assigned to the second discharge electric power amount, and updating the carbon dioxide emission amount per unit electric power amount and the charge electric power amount selected.

5. The emission amount management device according to claim 4, wherein the history information includes a plurality of pairs of carbon dioxide emission amounts per unit electric power amount and charge electric power amounts, and the selecting the carbon dioxide emission amount per unit electric power amount and the charge electric power amount to be assigned to the second discharge electric power amount comprises selecting the carbon dioxide emission amount per unit electric power amount and the charge electric power amount to be assigned to the second discharge electric power amount, in descending order of the carbon dioxide emission amounts per unit electric power amount in the history information.

6. The emission amount management device according to claim 4, wherein the operations further comprise:

performing authentication between the electric vehicle and a charger or a charger-discharger connected to the electric vehicle, wherein when the authentication is completed, transmitting a permission signal to charge, discharge, or charge and discharge to the charger or the charger-discharger, when the electric vehicle is charged, obtaining the charge information from the charger or the charger-discharger, and when the electric vehicle is discharged, obtaining the second discharge information from the charger or the charger-discharger.

7. The emission amount management device according to claim 1, wherein the electric vehicle further includes an engine as a drive source or a power generator, and the operations further comprise obtaining a gasoline use amount of the electric vehicle during the traveling, and calculating a carbon dioxide emission amount of the engine during the traveling from the gasoline use amount obtained, and adding the carbon dioxide emission amount calculated to the cumulative emission amount.

8. A charging device that, when charging an electric vehicle, transmits information indicating a carbon dioxide emission amount per unit electric power amount of electric power with which the electric vehicle is charged and a charge electric power amount to the emission amount management device according to claim 1.

9. The charging device according to claim 8, wherein the operations performed by the processor of the emission amount management device further comprise obtaining second discharge information including a second discharge electric power amount discharged when the electric vehicle is not traveling, and the charging device transmits the second discharge information including the second discharge electric power amount discharged when the electric vehicle is not traveling, to the emission amount management device.

10. The emission amount management device according to claim 1, wherein the selecting comprises sequentially selecting one or more pairs from the plurality of pairs in ascending order of the carbon dioxide emission amounts per unit electric power amount until a total assigned electric power amount assigned to the one or more pairs reaches the first discharge electric power amount, for each selected pair among the one or more pairs, the discharge electric power amount assigned to the selected pair is a smaller one of an unassigned portion of the first discharge electric power amount and the remaining charge electric power amount of the selected pair, the dynamic history update process comprises, for each selected pair among the one or more pairs:

updating the remaining charge electric power amount of the selected pair by subtracting the discharge electric power amount assigned to the selected pair from the remaining charge electric power amount of the selected pair; and when the remaining charge electric power amount of the selected pair is zero after the updating, deleting the selected pair from the history information, and the calculating the carbon dioxide emission amount comprises calculating, for each selected pair among the one or more pairs, a partial carbon dioxide emission amount from the discharge electric power amount assigned to the selected pair and the carbon dioxide emission amount per unit electric power amount of the selected pair, and summing the partial carbon dioxide emission amounts calculated for the one or more pairs.

11. An emission amount management method of managing a carbon dioxide emission amount related to traveling of an electric vehicle, the emission amount management method comprising:

obtaining charge information including information indicating a carbon dioxide emission amount per unit electric power amount of electric power with which the electric vehicle is charged in a particular charging session and a charge electric power amount in the particular charging session;

obtaining first discharge information including a first discharge electric power amount consumed by the electric vehicle during a particular travel segment;

selecting, from history information including a plurality of pairs each associating, for each charging event corresponding to a particular charging session, the carbon dioxide emission amount per unit electric power amount in the charging event with a remaining charge electric power amount that is the charge electric power amount after charging in the charging event, at least one pair to be assigned to at least part of the first discharge electric power amount, and calculating the carbon dioxide emission amount from the carbon dioxide emission amount per unit electric power amount of the at least one pair selected and the first discharge electric power amount;

performing, on the at least one pair selected, a dynamic history update process of:

updating the remaining charge electric power amount of the at least one pair selected by subtracting, from the remaining charge electric power amount, a discharge electric power amount assigned to the at least one pair selected, the discharge electric power amount assigned to the at least one pair selected being all or part of the first discharge electric power amount;

when the remaining charge electric power amount is zero after the updating, deleting the at least one pair selected from the history information;

obtaining a travel distance traveled by the electric vehicle during the particular travel segment;

adding the travel distance obtained to a cumulative travel distance that is an integrated value of travel distances, adding the carbon dioxide emission amount calculated to a cumulative emission amount that is an integrated value of carbon dioxide emission amounts, and dividing the cumulative emission amount to which the carbon dioxide emission amount has been added by the cumulative travel distance to which the travel distance has been added to calculate a carbon dioxide emission amount per unit distance; and when the carbon dioxide emission amount per unit distance is greater than a predetermined value, transmitting, to a display device of the electric vehicle, a display signal for preferentially displaying a charge location where the carbon dioxide emission amount per unit electric power amount is less than or equal to a predetermined amount.

12. The emission amount management method according to claim 11, wherein the selecting comprises sequentially selecting one or more pairs from the plurality of pairs in ascending order of the carbon dioxide emission amounts per unit electric power amount until a total assigned electric power amount assigned to the one or more pairs reaches the first discharge electric power amount, for each selected pair among the one or more pairs, the discharge electric power amount assigned to the selected pair is a smaller one of an unassigned portion of the first discharge electric power amount and the remaining charge electric power amount of the selected pair, the dynamic history update process comprises, for each selected pair among the one or more pairs:

updating the remaining charge electric power amount of the selected pair by subtracting the discharge electric power amount assigned to the selected pair from the remaining charge electric power amount of the selected pair; and when the remaining charge electric power amount of the selected pair is zero after the updating, deleting the selected pair from the history information, and the calculating the carbon dioxide emission amount comprises calculating, for each selected pair among the one or more pairs, a partial carbon dioxide emission amount from the discharge electric power amount assigned to the selected pair and the carbon dioxide emission amount per unit electric power amount of the selected pair, and summing the partial carbon dioxide emission amounts calculated for the one or more pairs.

* * * * *